US009102261B2

(12) United States Patent
Chang (10) Patent No.: US 9,102,261 B2
(45) Date of Patent: Aug. 11, 2015

(54) VEHICULAR COLLISION-ACTIVATED INFORMATION EXCHANGE METHOD AND APPARATUS USING WIRELESS COMMUNICATION RADIOS

(71) Applicant: Zen Lee Chang, Richardson, TX (US)

(72) Inventor: Zen Lee Chang, Richardson, TX (US)

( * ) Notice: Subject to any disclaimer, the term of this patent is extended or adjusted under 35 U.S.C. 154(b) by 136 days.

(21) Appl. No.: 13/875,094

(22) Filed: May 1, 2013

(65) Prior Publication Data

US 2013/0300552 A1 Nov. 14, 2013

Related U.S. Application Data

(60) Provisional application No. 61/645,350, filed on May 10, 2012.

(51) Int. Cl.
| | |
|---|---|
| *B60Q 1/00* | (2006.01) |
| *B60Q 9/00* | (2006.01) |
| *G08G 1/00* | (2006.01) |
| *G08G 1/16* | (2006.01) |

(52) U.S. Cl.
CPC *B60Q 9/00* (2013.01); *G08G 1/205* (2013.01); *G08G 1/161* (2013.01)

(58) Field of Classification Search
CPC .... B60R 21/013; B60R 21/0136; B60Q 9/00; G08G 1/205; G01S 5/0072
USPC ................ 340/436; 701/300, 301; 455/404.1, 455/404.2
See application file for complete search history.

(56) References Cited

U.S. PATENT DOCUMENTS

| | | | |
|---|---|---|---|
| 4,638,289 A * | 1/1987 | Zottnik | 246/45 |
| 6,076,026 A * | 6/2000 | Jambhekar et al. | 701/29.6 |
| 6,185,490 B1 * | 2/2001 | Ferguson | 701/32.2 |
| 6,211,777 B1 * | 4/2001 | Greenwood et al. | 340/436 |
| 6,836,211 B2 | 12/2004 | Joo | |
| 6,978,119 B2 | 12/2005 | Chen | |
| 7,069,118 B2 * | 6/2006 | Coletrane et al. | 701/1 |
| 7,110,382 B2 | 9/2006 | Sharma et al. | |
| 7,289,786 B2 * | 10/2007 | Krasner | 455/404.2 |
| 7,317,397 B2 | 1/2008 | Gunsauley | |
| 7,689,169 B2 | 3/2010 | Lee et al. | |
| 7,868,748 B2 | 1/2011 | Kiribayashi | |
| 8,330,593 B2 * | 12/2012 | Golenski | 340/438 |
| 8,548,686 B2 * | 10/2013 | Pisz | 701/45 |
| 8,666,590 B2 * | 3/2014 | Follmer et al. | 701/32.2 |
| 2001/0006373 A1 | 7/2001 | Jeong | |
| 2002/0135679 A1 * | 9/2002 | Scaman | 348/148 |
| 2003/0212567 A1 * | 11/2003 | Shintani et al. | 705/1 |
| 2004/0088090 A1 * | 5/2004 | Wee | 701/35 |
| 2007/0136078 A1 * | 6/2007 | Plante | 705/1 |
| 2007/0162230 A1 | 7/2007 | Lin | |
| 2007/0167147 A1 * | 7/2007 | Krasner et al. | 455/404.2 |
| 2010/0253494 A1 * | 10/2010 | Inoue | 340/436 |
| 2010/0256859 A1 * | 10/2010 | Leyerle et al. | 701/32 |
| 2013/0218603 A1 * | 8/2013 | Hagelstein et al. | 705/4 |

* cited by examiner

*Primary Examiner* — Eric M Blount
(74) *Attorney, Agent, or Firm* — Arent Fox LLP (57) ABSTRACT

A method, a system, and an apparatus used to automatically exchange identification and collision-related information utilizing wireless communication devices during vehicular accidents are presented. Upon collision, an impact sensor detects and registers the crash, causing a processor to trigger a collision warning, record selected identification and collision-related information in an electronic file, and exchange the same through a secure wireless connection with a collision-activated information exchange device (CIED) of the other vehicle involved and/or with an information exchange device (IED) or devices in the area of the collision. The stored electronic files can later be accessed by and/or even transmitted to authorities to serve as evidence in hit-and-run investigation and/or accident reconstruction.

10 Claims, 8 Drawing Sheets

VEHICULAR COLLISION-ACTIVATED INFORMATION EXCHANGE METHOD AND APPARATUS USING WIRELESS COMMUNICATION RADIOS

CLAIM OF PRIORITY UNDER 35 U.S.C. §119

This application claims the benefit of and priority to U.S. Provisional Patent Application No. 61/645,350, titled "Vehicular Collision-Activated Information Exchange Method and Apparatus Using Wireless Communication Radios," filed May 10, 2012, the disclosure of which is hereby incorporated in its entirety by reference herein.

BACKGROUND

1. Field

Aspects of the present invention generally relate to a method of wireless information exchange, and more particularly, to recording of pertinent identification and collision-related information after a vehicular collision, and automatic exchange of such information among involved and bystander parties, such as other vehicles, pedestrians, bystanders, properties, infrastructures, and objects.

2. Introduction

As vehicles become safer with an array of advanced preventive measures and increasingly sophisticated life-saving technologies installed, operators, properties, and even pedestrians are more likely to survive a reduced overall impact of an unfortunate accident. However, these potential lifesavers are often designed to function before or to protect physically during a collision, yet seldom are devised to consider the emotional aspects in the wake of a damaging crash. The mental distress stemming from the unknown can be particularly unnerving, when the victims and/or their loved ones desperately seek justice, closure, and peace-of-mind after experiencing a hit-and-run accident, which remains one of the most deplorable crimes we still face.

Therefore, there exists an unmet need in the art for a method and an apparatus that may be used to automatically exchange identification and collision-related information utilizing wireless communication devices during vehicular accidents.

SUMMARY

Aspects of the present invention address the concern above with a method and an apparatus to acquire identification and collision-related information from all parties involved in a vehicular collision, via wireless file transfer.

For example, according to an aspect of the present invention, a collision-activated information exchange device (CIED) includes an impact sensor that sends a signal upon detecting a collision to a processor of the CIED or an onboard computer that accesses and controls a plurality of peripheral equipment. The processor then contemporaneously engages the CIED's wireless communication radio, and logs in an electronic file, real-time information obtained from a data-storage element, in addition to the vehicle's shared resources, such as data recorder (a vehicle "black box"), timekeeping instrument, speed indicator, and/or navigation system (e.g., Global Positioning System (GPS)), and subsequently transmits said record(s). The processor also receives similar information from other vehicle(s) involved and/or from approved information exchange device(s) available in range, for future access.

According to another aspect of the present invention, a method may include detecting a collision, broadcasting a detection signal related to the collision, receiving a response to the detection signal from a remote device, establishing a wireless connection with the remote device based on the response, and exchanging collision-related information with the remote device.

According to another aspect of the present invention, a communication device may include a sensor configured to detect a collision, a wireless communication radio configured to broadcast a detection signal related to the collision, receive a response to the detection signal from a remote device, establish a wireless connection with the remote device based on the response, and a processor configured to exchange collision-related information with the remote device via the wireless communication radio.

According to another aspect of the present invention, an apparatus may include means for detecting a collision, means for broadcasting a detection signal related to the collision, means for receiving a response to the detection signal from a remote device, means for establishing a wireless connection with the remote device based on the response, and means for exchanging collision-related information with the remote device.

According to another aspect of the present invention, a computer program product may include a non-transitory computer-readable medium having control logic stored therein for causing a computer to perform exchange of collision-related information, the control logic including first code for detecting a collision, second code for broadcasting a paging detection signal related to the collision, third code for receiving a response to the paging detection signal from a remote device, fourth code for establishing a wireless connection with the remote device based on the response, and fifth code for exchanging collision-related information with the remote device.

According to another aspect of the present invention, a method may include receiving a detection signal from a remote device, establishing a wireless connection with the remote device based on the detection signal, and exchanging collision-related information with the remote device.

According to another aspect of the present invention, a communication device may include a wireless communication radio configured to receive a detection signal from a remote device and establish a wireless connection with the remote device based on the detection signal, and a processor configured to exchange collision-related information with the remote device via the wireless communication radio.

Armed with recovered vehicle details, law-enforcement agencies and/or insurance companies may quickly gather evidence for investigation so that affected individual(s) is/are able to take solace in the identification of the reckless perpetrator, along with the justice that awaits him or her. Moreover, recognizing that it is becoming futile to flee the scene of an accident, an operator that causes an injurious crash may be more inclined to stop, stay, and/or call for help, further improving a victim's chance of survival.

BRIEF DESCRIPTION OF THE DRAWINGS

These and other sample aspects of the disclosure will be described in the detailed description and the appended claims that follow, and in the accompanying drawings, wherein:

In accordance with common practice the various features illustrated in the drawings may be simplified for clarity. Thus, the drawings may not depict all of the components of a given apparatus or method. In addition, like reference numerals may be used to denote like features throughout the specification and figures.

DETAILED DESCRIPTION

Various aspects of the present invention are described below. It should be apparent that the teachings herein may be embodied in a wide variety of forms and that any specific structure, function, or both being disclosed herein may be merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality, in addition to or other than one or more of the aspects set forth herein. An aspect may comprise one or more elements of a claim.

Various aspects of the present invention solve the above-identified needs, as well as others, via devices, methods, and systems capable of receiving and transmitting information related to a vehicular collision.

Figure 1:
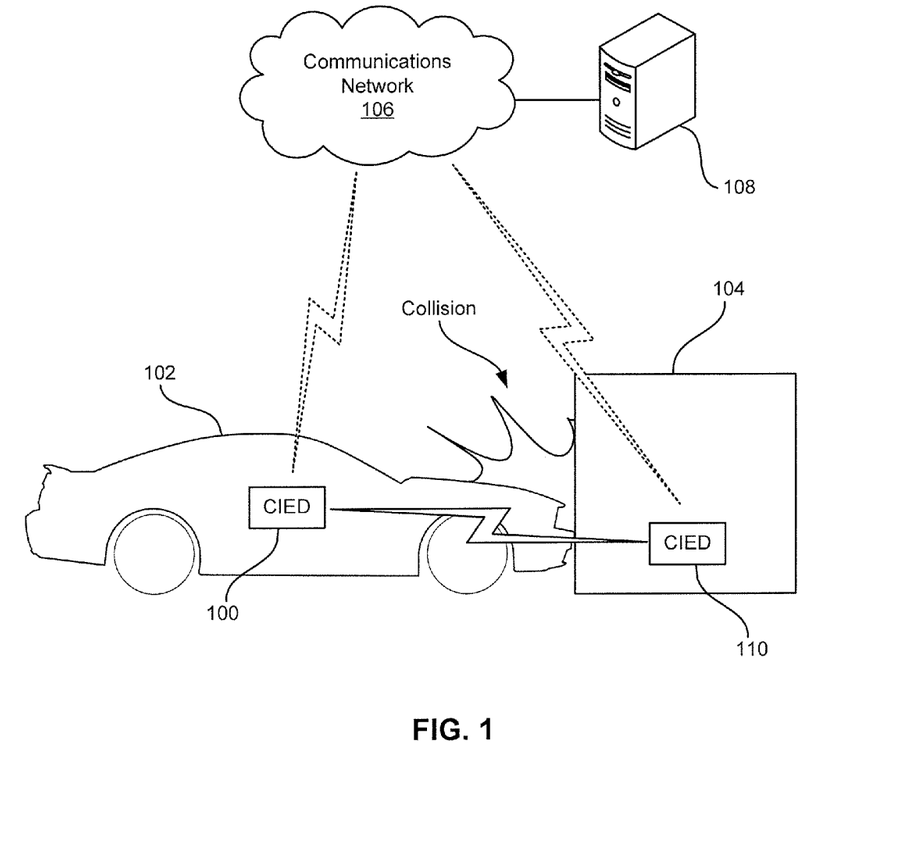
FIG. 1 is an example block diagram illustrating information exchange between a first collision-activated information exchange device (CIED) and a second CIED, in accordance with some aspects of the present invention.

FIG. 1 is an example block diagram illustrating information exchange between a collision-activated information exchange device (CIED) 100 of vehicle 102 and a CIED 110 of object 104, in accordance with some aspects of the present invention.

As shown in FIG. 1, the CIED 100 may be provided within the vehicle 102. The vehicle 102 may be an automobile, a watercraft, an aircraft, or any other suitable type of mobile transport. The CIED 100 may be stand-alone or integrated with an on-board computer (not shown). For example, the CIED 100 may be electrically and/or wirelessly coupled to an on-board computer or other instrumentation (e.g., speedometer, GPS, impact sensor) of the vehicle 102, in order to effectively retrieve and store any relevant information and parameters, such as Vehicle Identification Number (VIN), Hull Identification Number (HIN), or equivalent form of identification from a data storage unit or an identification module, as well as date and time of collision, speed and acceleration profiles of the vehicle prior to and during impact, and/or GPS profile and coordinates for location and direction of travel prior to impact, for example. Any wireless connection between the CIED 100 and the vehicle 102 may be by way of a Wireless Local Area Network (WLAN), such as an IEEE 802.11x network, or a Wireless Personal Area Network, such as a Bluetooth network, an IEEE 802.15x network, or some other type of network.

The vehicle 102 may collide with an object 104, as indicated by the "collision" label. The object 104 may be another vehicle, such as an automobile, a watercraft, an aircraft, or any other suitable type of mobile transport, either moving or stationary. The object 104 may also include its own CIED 110, which may be connected to the object 104 in a manner similar to that of the connection between the CIED 100 and the vehicle 102.

The collision between the vehicle 102 and the object 104 may prompt CIED 100 and CIED 110 to exchange information with each other. If, for example, the object 104 is another vehicle, both CIED 100 and CIED 110 may exchange one or a combination of the aforementioned relevant information, such as identification information, date and time of collision, speed and acceleration profiles of the vehicle prior to and during impact, and/or GPS profile and coordinates for location and direction of travel prior to impact.

Once relevant information has been exchanged, the CIED's 100 and 110 may respectively store the information for manual retrieval (e.g., download to an approved device) and/or may transmit the information wirelessly, for example, via a communications network 106 to a remote server 108 for analysis by the appropriate authorities.

Figure 2:
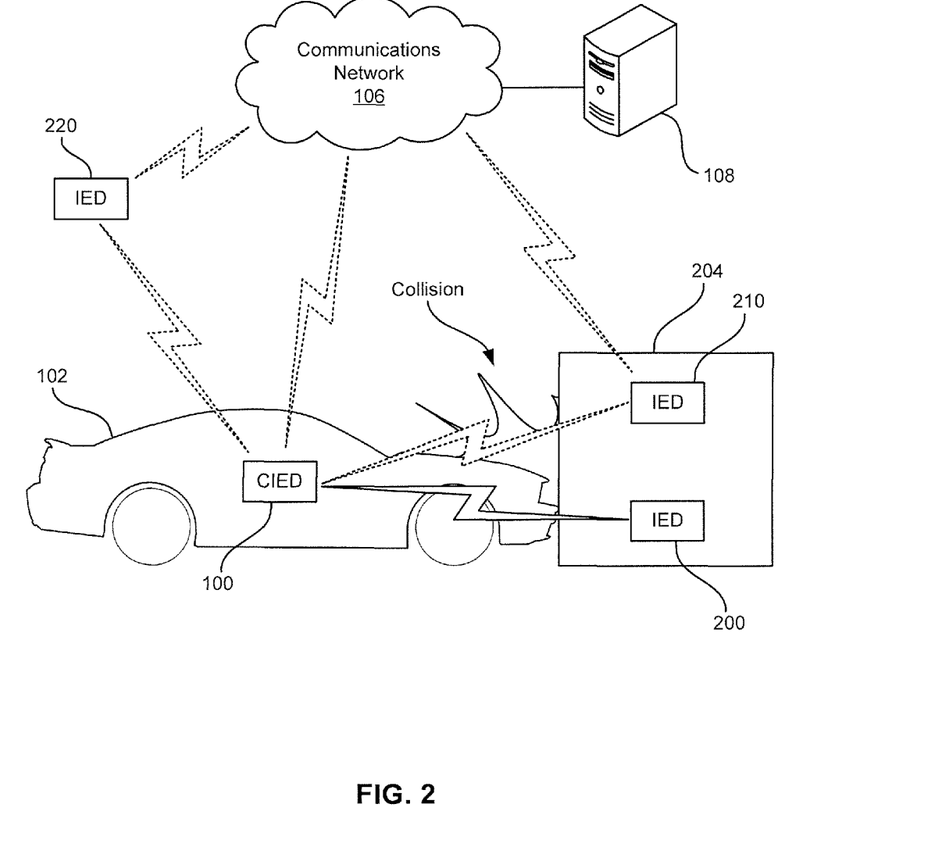
FIG. 2 is an example block diagram illustrating information exchange between a first CIED and a plurality of other information exchange devices (IED's), in accordance with some aspects of the present invention.

FIG. 2 is a block diagram illustrating information exchange among the CIED 100 and a plurality of other information exchange devices IED's 200, 210, 220. In the scenario illustrated in FIG. 2, the vehicle 102 is shown to have collided with an object 204. The object 204 may be another vehicle, such as an automobile, a watercraft, an aircraft, or any other suitable type of mobile transport, either moving or stationary, or it could also be a structure (e.g., building, monument, lamp post), or any person or thing (e.g., tree). The object 204 may also include one or a plurality of IED's 200, 210. There may also be other IED's within range of the collision, such as IED 220, that may or may not be associated with either the vehicle 102 or the object 204. As will be described later, an IED may differ from a CIED in that the IED may not be configured to detect a collision via a collision sensor, for example. Furthermore, the IED may not be configured to interface electrically or wirelessly with the object 204 or other IED's, and may be used primarily to store identification information (to be transmitted upon legitimate request), such as a mobile phone number, a property serial number, or an equivalent form of identification, as well as date, time, and/or GPS coordinates for location, for example.

The collision between the vehicle 102 and the object 204 may prompt CIED 100 to exchange information with any available IED's that are in communication range if the object 204 does not include a CIED. To establish communication with the IED's 200, 210, 220, the CIED 100 may broadcast a detection signal, for example. Upon receipt of the detection signal, the IED's 200, 210, 220 may establish communication with the CIED 100 and exchange any relevant information. For example, each one of the IED's 200, 210, 220 may provide the CIED 100 with its respective stored identification information (plus date, time, and/or GPS coordinates for location), and the CIED 100 may in turn provide the IED's 200, 210, 220 with its own stored identification information, date and time of collision, speed and acceleration profiles of the vehicle prior to and during impact, and/or GPS profile and coordinates for location and direction of travel prior to impact.

Once relevant information has been exchanged, the CIED 100 and the IED's 200, 210, 220 may store the information for manual retrieval (e.g., download to an approved device) and/or may transmit the information wirelessly via a communications network 106 to a remote server 108 for analysis by the appropriate authorities.

Figure 3:
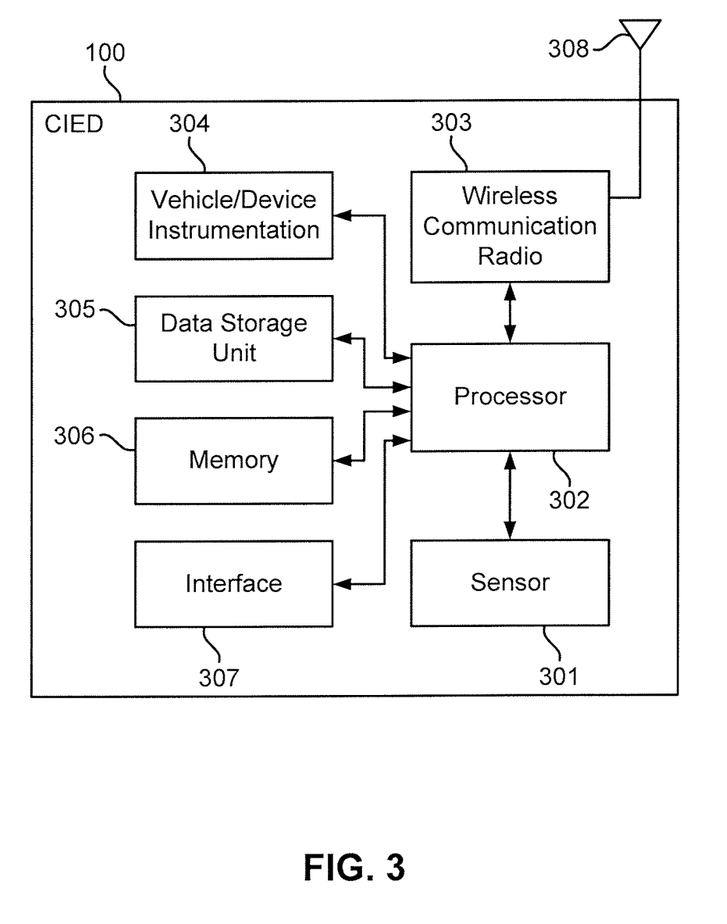
FIG. 3 is an example system block diagram depicting a simplified interconnection scheme of internal components of a CIED, in accordance with some aspects of the present invention.

FIG. 3 is an example system block diagram depicting a simplified interconnection scheme of internal components of CIED 100, in accordance with some aspects of the present invention. As shown in FIG. 3, the CIED 100 may include a sensor 301, a processor 302, a wireless communication radio 303, vehicle/device instrumentation 304, a data storage unit 305, a memory 306, an interface 307, and an antenna 308.

The sensor 301 may be a collision detection system, a collision warning/alert system, a collision avoidance system, a pre-crash system, a crash sensor, a pressure sensor, a proximity sensor, an ultrasound-based sensor, a peripheral monitor (e.g. blind spot, cross-traffic alert, rear view, back up), a camera-based system, or any type of system (e.g. electrical, mechanical, optical, barometric, biological/organic), sensor, or monitor with a mechanism suitable and/or configured to detect an impact or a collision, and/or to sense/alert an imminent crash. During operation, the sensor 301 may detect an impact of a collision with an object and relay the impact signal to the processor 302, which in turn may power up or awaken the wireless communication radio 303 with attached antenna 308 to establish a localized connection or pairing with another CIED or an IED, for example. The processor 302 may then display and/or sound a collision warning to a user either via the vehicle/device instrumentation 304 (e.g., display, speaker, or other notification system located on the CIED 100 (not shown)) or on the vehicle's dashboard that is interfaced with the vehicle/device instrumentation 304, for example. The processor 302 may then request information, such as Vehicle Identification Number (VIN), Hull Identification Number (HIN), or equivalent form of identification from the data storage unit 305, as well as date, time, approximate speed at impact, and/or GPS coordinates for location from the vehicle/device instrumentation 304. Next, the processor 302 may record the collected information in the memory 306.

Once the information is recorded, the processor 302 may initialize a discovery for CIED's of other vehicles that were involved in the collision. The collision area of discovery may cover an area having a radius up to one mile, for example, or any area within which any information about the collision may be gathered. Such discovery may be conducted by broadcasting at least one detection signal via the wireless communication radio 303, for example, and listening for responses or similar discovery detection signals transmitted by other CIED's.

If a CIED of the other vehicle involved in the collision is discovered, the CIED 100 and the discovered CIED may establish a connection, during which the CIED 100 may authenticate and confirm that the discovered CIED is, in fact, the CIED of a vehicle involved in the collision. After the connection is established, the processor 302 may proceed to transmit the recorded information (e.g., VIN, etc.) via the wireless communication radio 303 to the CIED of the other vehicle. The processor 302 may then receive similar information from the other vehicle's CIED via the wireless communication radio 303 and save the received information in the memory 306, for example. The other vehicle's CIED may also execute the above steps in a similar fashion, thus completing the data exchange cycle.

If, on the other hand, the processor 302 of the CIED 100 is unable to locate (i.e., discover) other CIED's of vehicles/objects involved in the collision, then the processor 302 may initialize a discovery of IED's. The discovery of IED's may be performed in a manner similar to that of CIED's. It should also be noted that the discovery of other CIED's and the discovery of IED's may be performed concurrently, sequentially, or in a temporally overlapping manner, for example.

If any IED's in the area of the collision are discovered, the processor 302 of the CIED 100 may proceed to establish a wireless connection with the discovered IED's. Once such a connection is established, the processor 302 may transmit the recorded information (e.g., VIN) via the wireless communication radio 303 to the IED's. The processor 302 may then receive similar information (e.g., identification) from the IED's via the wireless communication radio 303 and save the received information in the memory 306.

Any or all of the information acquired as a result of the collision and stored in the memory 306 of the CIED 100 may be retrieved and/or removed via the interface 307 by authorized agents and/or wirelessly transmitted via a communications network 106 to a remote server 108 (or downloaded to an approved device) for analysis by the appropriate authorities, for example. The appropriate authorities or authorized agents, either wirelessly or via the interface 307, for example, may also be able to check for and/or be notified of a tampered vehicle apparatus through built-in measures, plus reset the collision warning display, if applicable.

Figure 4:
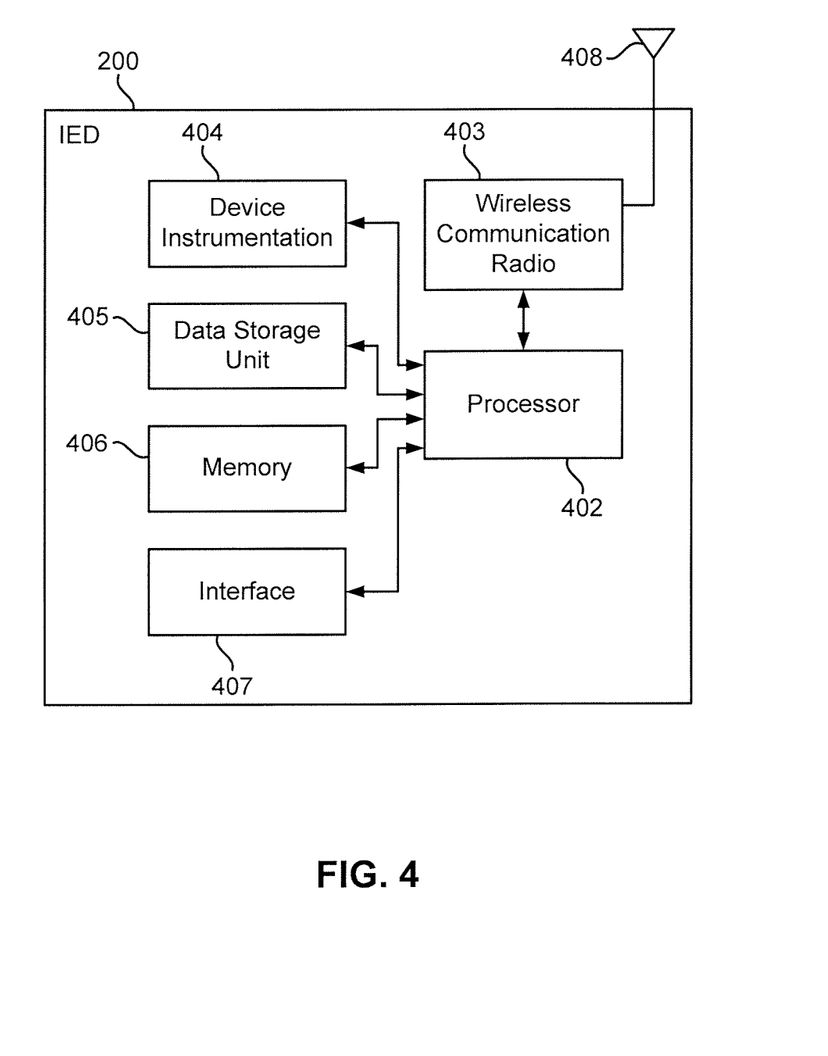
FIG. 4 is an example system block diagram depicting a simplified interconnection scheme of internal components of an IED, in accordance with some aspects of the present invention.

FIG. 4 is an example system block diagram depicting a simplified interconnection scheme of internal components of an IED 200, in accordance with some aspects of the present invention. As shown in FIG. 4, the IED 200 may include a processor 402, a wireless communication radio 403, device instrumentation 404, a data storage unit 405, a memory 406, an interface 407, and an antenna 408, for example.

As previously discussed with reference to FIG. 3, the CIED 100 may conduct discovery of IED's by transmitting a detection signal in the area of the collision. The processor 402 of the IED 200, as shown in FIG. 4, may receive and register the detection signal from a CIED via the wireless communication radio 403 with attached antenna 408, for example. After the detection signal is received and registered, the processor 402 of the IED 200 may establish wireless communication with the CIED via the wireless communication radio 403. The processor 402 may also display and/or sound a collision warning to a user via the device instrumentation 404 (e.g., display, speaker, or other notification system located on the IED 200 (not shown)). The processor 402 may then request information, such as mobile phone number, property serial number, or equivalent form of identification from the data storage unit 405, as well as date, time, and/or GPS coordinates for location from the device instrumentation 404, and record the collected information in the memory 406, for example.

With the wireless connection established between the IED 200 and the CIED, the processor 402 may proceed to transmit the recorded information via the wireless communication radio 403 to the CIED. The processor 402 may then receive similar information from the CIED via the wireless communication radio 403 and save the received information in the memory 406.

Any or all of the information acquired as a result of the collision and stored in the memory 406 of the IED 200 may be retrieved and/or removed via the interface 407 by authorized agents and/or wirelessly transmitted via a communications network 106 to a remote server 108 (or downloaded to an approved device) for analysis by the appropriate authorities, for example. The appropriate authorities or authorized agents, either wirelessly or via the interface 407, for example, may also be able to check for and/or be notified of a tampered device apparatus through built-in measures, plus reset the collision warning display if applicable.

Figure 5A:
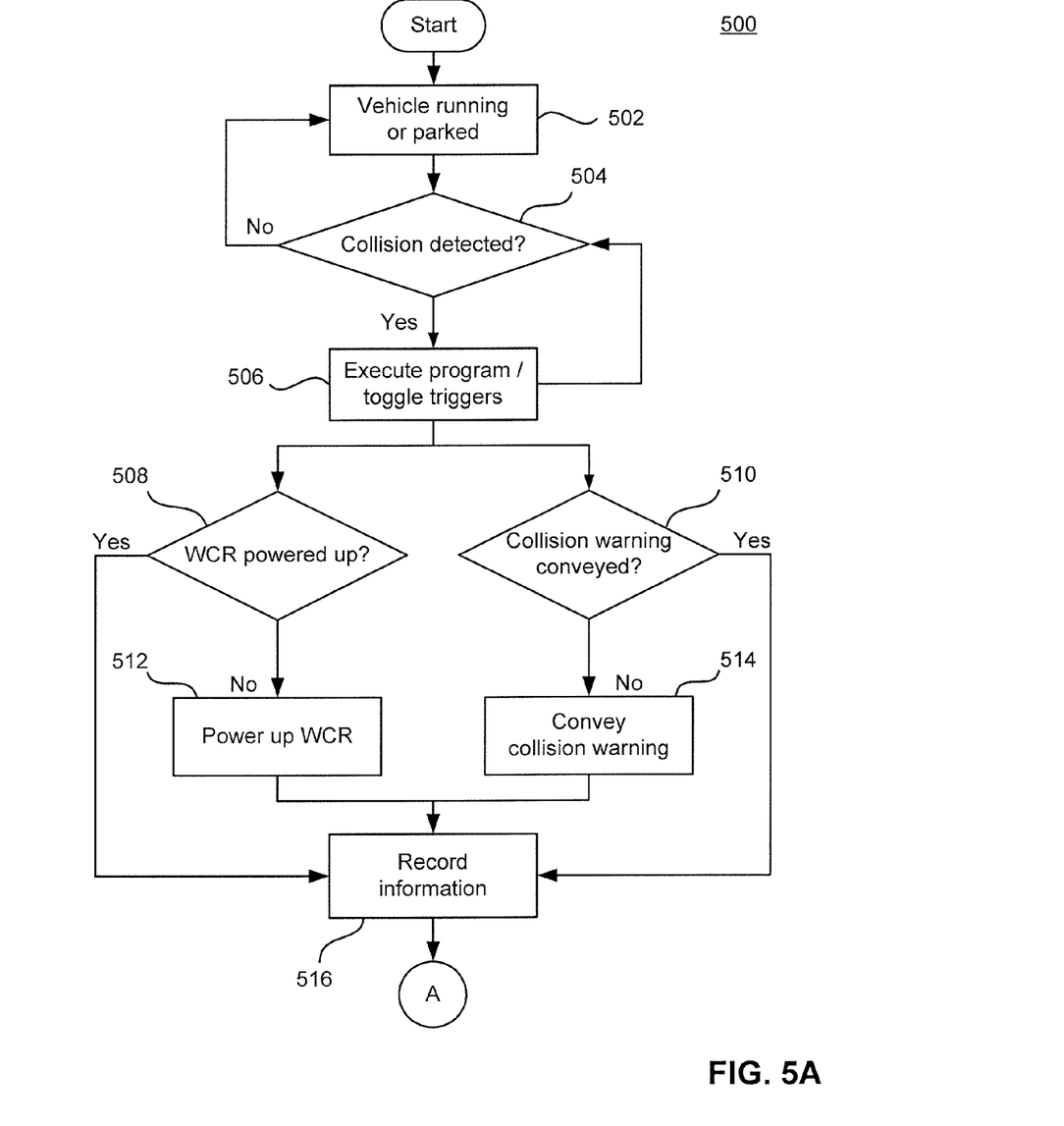
FIGS. 5A and 5B show a flowchart of an example method of vehicular collision-activated information exchange from a perspective of a CIED, in accordance with some aspects of the present invention.
Figure 5B:
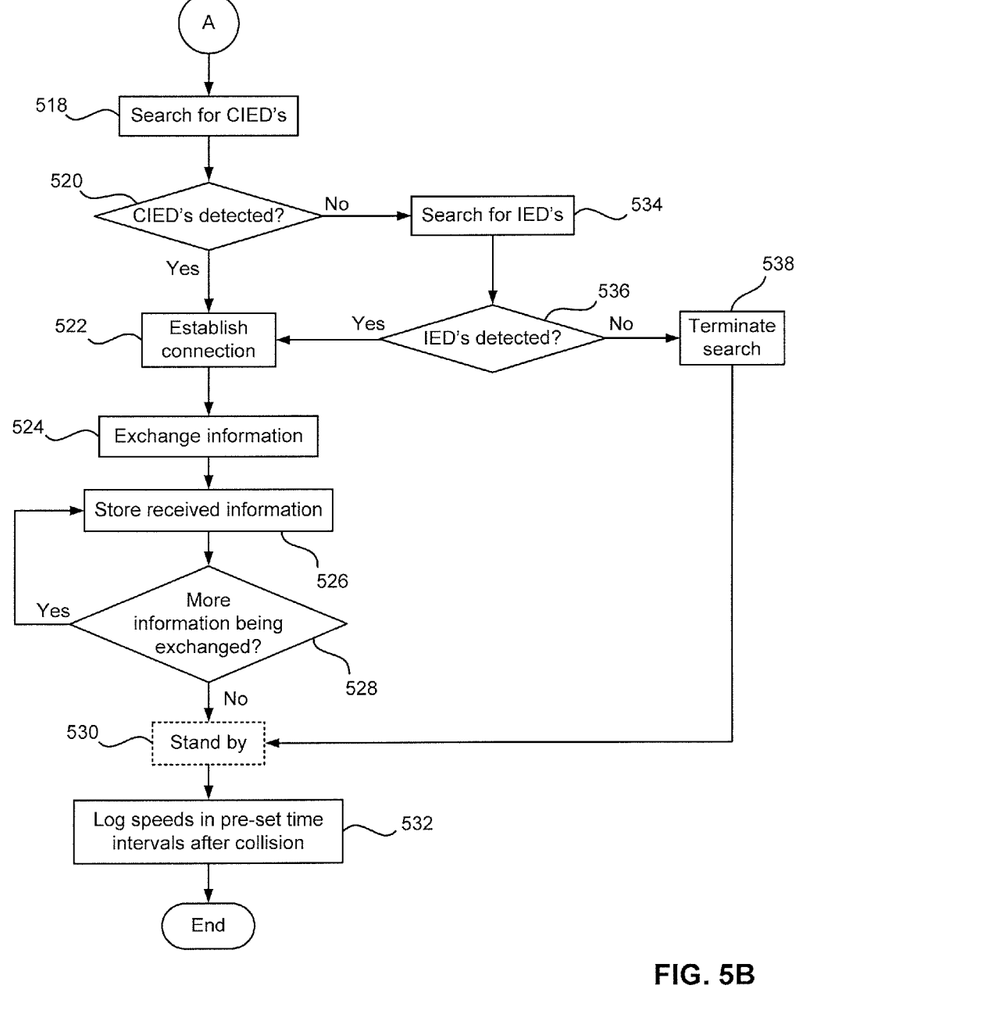

FIGS. 5A and 5B show a flowchart 500 of an example method of vehicular collision-activated information exchange from a perspective of a CIED, such as the CIED 100 of FIG. 3, in accordance with some aspects of the present invention.

As shown in FIG. 5A, in block 502, a vehicle including a CIED may initially be either moving or located in a parked state. In block 504, a determination is made as to whether or not a collision has been detected. If a collision has not been detected, the process returns to block 502, otherwise, the process may proceed to block 506. In block 506, an information exchange program may be executed and a trigger may be toggled to return the process to block 504 to stand by, in the event of an additional collision. For example, If the sensor 301 of the CIED 100 does not detect a collision, the vehicle may continue to operate per block 502; however, if the sensor 301 detects a collision, a signal may be sent to the processor 302 to execute the information exchange program of the CIED 100 and then toggle the trigger to stand by, in the event of additional collisions occurring.

In block 508, a determination is made as to whether or not a wireless communication radio is powered up; if not, the process may proceed to block 512 where the wireless communication radio is powered up and the process may then proceed to block 516. Otherwise, the process may proceed directly from block 508 to block 516. For example, as shown in FIG. 3, the processor 302 may check whether or not the wireless communication radio 303 is powered up or awakened. If the radio 303 is not powered up, then the processor 302 powers up or awakens the radio 303.

In block 510, a determination is made as to whether or not a collision warning has been conveyed; if not, the process may proceed to block 514 where the collision warning is conveyed, and the process may proceed to block 516. Otherwise, the process may proceed directly from block 510 to block 516. For example, as shown in FIG. 3, the processor 302 may check whether or not a collision warning has been displayed or sounded to a user of the CIED 100. If no collision warning has been conveyed to a user, the processor 302 may display and/or sound a collision warning to a user via the vehicle/device instrumentation 304 (e.g., display, speaker, or other notification system that is part of the CIED 100 or the vehicle).

In block 516, the process may gather and store in a local memory various identification information and collision parameters from instrumentation and data storage. The process may then proceed to block 518 of FIG. 5B. For example, as shown in FIG. 3, after the processor 302 confirms that the wireless communication radio 303 is powered up or awakened and that a collision warning is conveyed to a user, the processor 302 may request information, such as VIN, HIN, or equivalent form of identification from the data storage unit 305, as well as date, time, approximate speed at impact, and/or GPS coordinates from vehicle/device instrumentation 304, and record the collected information in the memory 306.

As shown in FIG. 5B, in block 518 the process may begin a search or a discovery of other CIED's of vehicles involved in the collision. Then, the process may proceed to block 520. For example, as shown in FIG. 3, the processor 302 may initialize the CIED discovery by broadcasting via the wireless communication radio 303 a detection signal and by listening to responses to the detection signal or similar discovery detection signals of other CIED's.

In block 520, a determination is made as to whether or not any CIED's of other vehicles involved in the collision have been discovered. If no CIED's have been detected, then the process may proceed to block 534. On the other hand, if one or more CIED's (in the event of multiple collisions) have been detected, the process may proceed to block 522. The determination made in block 520 may, for example, be made by the processor 302, as shown in FIG. 3. The processor 302 may terminate its search for other CIED's after a predetermined period of time if no CIED's have been discovered.

In block 534, the process may begin a search or a discovery of IED's in a manner similar to the discovery process of CIED's within the collision area, and the process may proceed to block 536. For example, as shown in FIG. 3, the processor 302 of the CIED 100 may initialize the IED discovery by broadcasting via the wireless communication radio 303 a detection signal and by listening to responses to the detection signal from any IED's.

In block 536, a determination is made as to whether or not any IED's in the area of the collision have been discovered. If no IED's have been detected, then the process may proceed to block 538, where the search for IED's is terminated and the process proceeds to block 530. On the other hand, if one or more IED's have been detected (e.g., a response to the detection signal has been received), the process may proceed to block 522. The determination made in block 536 may, for example, be made by the processor 302, as shown in FIG. 3. The processor 302 may terminate its search for IED's after a predetermined period of time if no IED's have been discovered.

In block 522, a connection may be established with a discovered CIED or, in the absence of any discovered CIED's, a discovered IED, and the process may proceed to block 524. For example, the CIED 100 may establish a localized connection or pairing with a discovered CIED or IED via the wireless communication radio 303.

In block 524, the process exchanges information with the discovered one or more CIED's or IED's, and the process may proceed to block 526, where the process stores the information received from the discovered one or more CIED's or IED's. Thereafter, the process may proceed to block 528. For example, as shown in FIG. 3, the processor 302 may transmit to the discovered one or more CIED's or IED's various information stored in memory 306 and/or data storage unit 305, such as identification, VIN, speed prior to impact, date, time, etc., via the wireless communication radio 303, and likewise receive and store any information received from the one or more CIED's or IED's in the memory 306.

In block 528, following the information exchange and storage, a determination is made as to whether or not more information is being exchanged in case of multiple collisions. If so, the process may proceed to block 526 to store the additional information that is received from the discovered CIED's or IED's. The determination of block 528 may be carried out repeatedly for every discovered CIED of each other vehicle involved in the collision or IED discovered in the collision area. Once the process has determined that no more information is being exchanged (i.e., there is no more additional information to be stored from any other CIED's or IED's and/or no other CIED's or IED's are requesting information), the process may proceed to block 530. The aforementioned determination process of block 528 may, for example, be performed by the processor 302 of the CIED 100, as shown in FIG. 3.

In block 530, various components of the CIED may optionally enter standby mode (e.g., dormant state), and the process may proceed to block 532. For example, as shown in FIG. 3, in the CIED 100, the wireless communication radio 303 may stand by once the processor 302 has determined that the collision information exchange is over.

In block 532, the process may log speeds in pre-set time intervals after the collision, after which the process may end. The speed-logging process of block 532 may, for example, be performed by the processor 302, as shown in FIG. 3.

Figure 6:
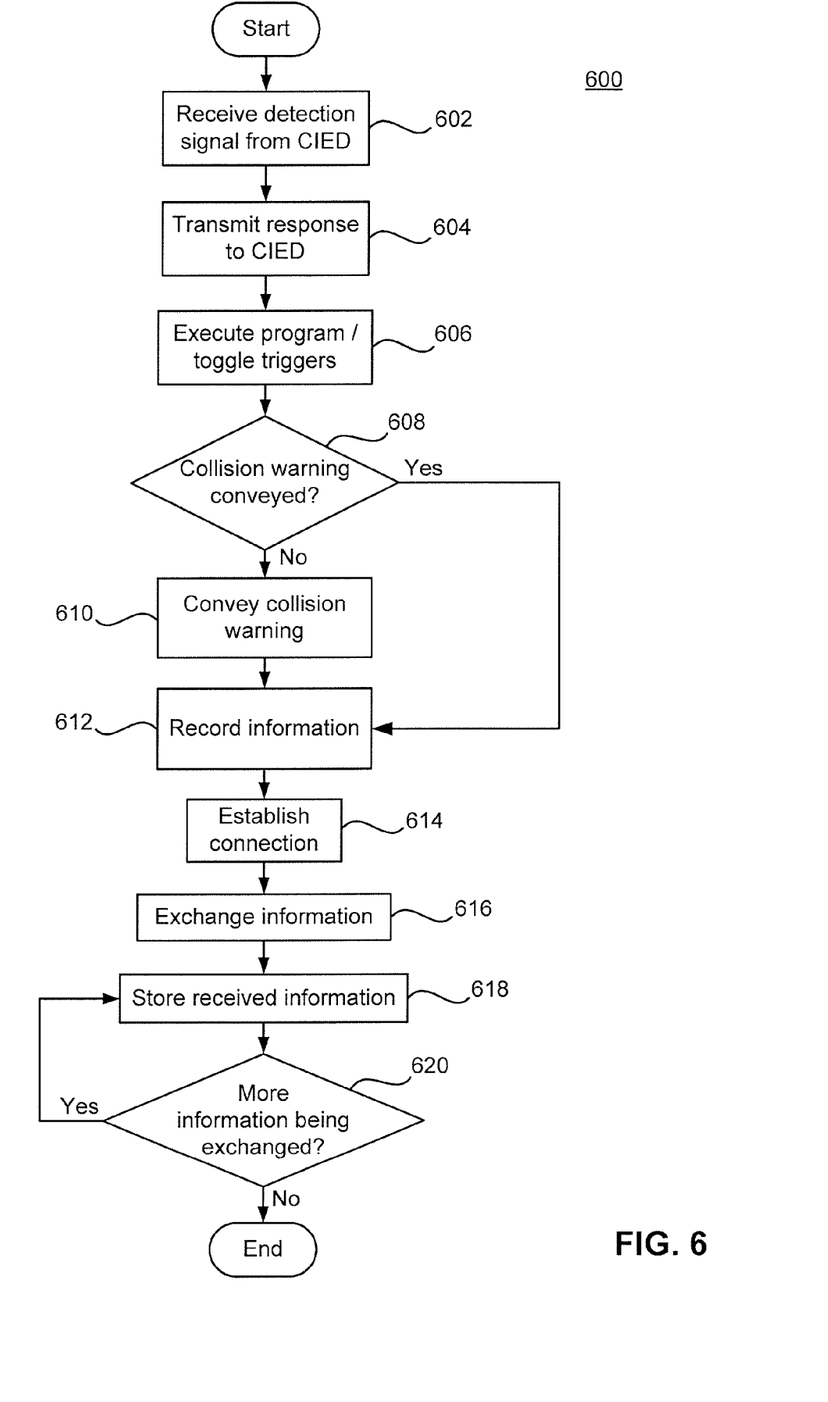
FIG. 6 shows a flowchart of an example method of vehicular collision-activated information exchange from a perspective of an IED, in accordance with some aspects of the present invention.

FIG. 6 shows an example flowchart 600 of a method of vehicular collision-activated information exchange from a perspective of an IED, such as an IED 200 of FIG. 4, in accordance with some aspects of the present invention.

As shown in FIG. 6, in block 602 the process may receive a detection signal from a CIED and proceed to block 604. For example, as shown in FIG. 4, the processor 402 of IED 200 may receive a detection signal from a CIED via the wireless communication radio 403 and antenna 408.

In block 604, the process may transmit a response to the CIED acknowledging receipt of the detection signal, and the process may proceed to block 606. For example, as shown in FIG. 4, the processor 402 may transmit a response to the CIED via the wireless communication radio 403.

It should be noted that if the broadcasting CIED no longer accepts connections or pairing after reaching any connectivity (including storage) limit and/or timing out due to inactivity, the wireless communication radio 403 may enter standby mode in the event of other broadcast detection signals. If, however, the CIED is accepting connections or pairing because connectivity capacity is available and/or it has not timed out, the processor 402 of the IED 200 may execute the device's information exchange program, as illustrated in block 606, and then toggle the trigger to stand by in the event of additional detection signals. Thereafter, the process may proceed to block 608.

In block 608, a determination is made as to whether or not a collision warning has been conveyed. If a collision warning has not been conveyed, the process may proceed to block 610 where the collision warning is conveyed. Thereafter, the process may proceed to block 612. Otherwise, if it is determined that a collision warning has been conveyed, the process may proceed directly from block 608 to block 612. In block 610, the process may convey a collision warning to a user. For example, as shown in FIG. 4, the processor 402 may display and/or sound a collision warning to a user via the device instrumentation 404 (e.g., display, speaker, or other notification system that is part of the IED 200). In block 612, the process may gather and store in a local memory various identification information from instrumentation and data storage. For example, the processor 402 may request information, such as mobile phone number, property serial number, or equivalent form of identification from the data storage unit 405, as well as date, time, and/or GPS coordinates from device instrumentation 404, and record the collected information in the memory 406.

In block 614, the process may establish a connection with the CIED and proceed to block 616. For example, as shown in FIG. 4, the processor 402 may establish connection or pairing with the CIED via the wireless communication radio 403.

In block 616, the process may exchange information with the CIED and may then proceed to block 618, where the process stores the information received from the CIED. Thereafter, the process may proceed to block 620. For example, as shown in FIG. 4, the processor 402 may transmit to the CIED various information stored in memory 406 and/or data storage unit 405, such as the mobile phone number, the property serial number, etc. (information gathered in block 612), via the wireless communication radio 403, and likewise receive and store any information received from the CIED in the memory 406.

In block 620, following information exchange and storage, a determination is made as to whether or not more information is being exchanged, in case of multiple collisions. If so, the process may proceed to block 618 to store the additional information that it receives from all CIED's that have established connection with the IED during the process. The determination of block 620 may be carried out repeatedly for every CIED that is involved in the collision and that established connection with the IED in the collision area. Once the process has determined that no more information is being exchanged (i.e., there is no more additional information to be stored from any other CIED's and/or no other CIED's are requesting information), the process may end. The aforementioned determination process of block 620 may, for example, be performed by the processor 402 of the IED 200, as shown in FIG. 4.

Figure 7:
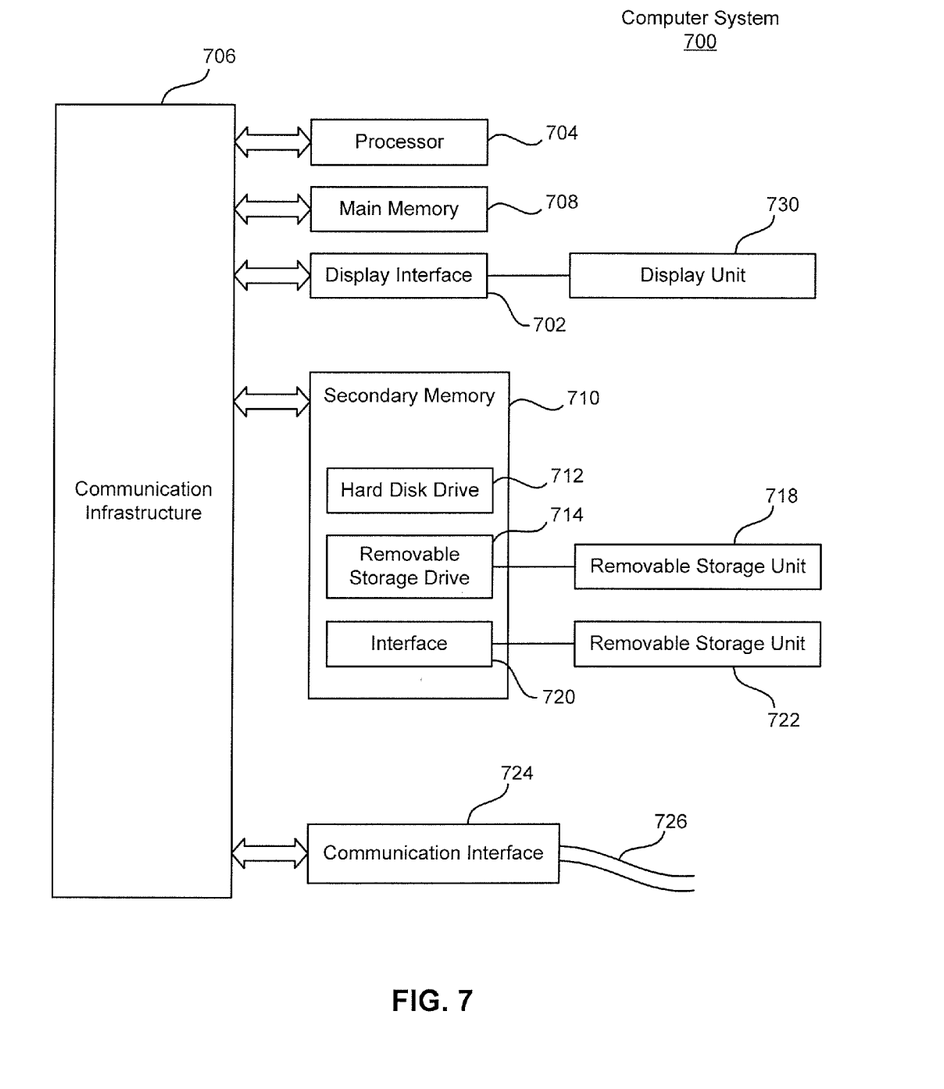
FIG. 7 is a block diagram of various example system components, for use in accordance with some aspects of the present invention.

Aspects of the present invention may be implemented using hardware, software, or a combination thereof and may be implemented in one or more computer systems or other processing systems. In one variation, aspects of the invention are directed toward one or more computer systems capable of carrying out the functionality described herein. An example of such a computer system 700 is shown in FIG. 7.

Computer system 700 includes one or more processors, such as processor 704. The processor 704 is connected to a communication infrastructure 706 (e.g., a communications bus, a cross-over bar, or a network). Various software aspects are described in terms of this exemplary computer system. After reading this description, it will become apparent to a person skilled in the relevant art(s) how to implement aspects of the invention using other computer systems and/or architectures.

Computer system 700 can include a display interface 702 that forwards graphics, text, and other data from the communication infrastructure 706 (or from a frame buffer not shown) for display on a display unit 730. Computer system 700 also includes a main memory 708, preferably random-access memory (RAM), and may also include a secondary memory 710. The secondary memory 710 may include, for example, a hard disk drive 712 and/or a removable storage drive 714, representing a floppy disk drive, a magnetic tape drive, an optical disk drive, etc. The removable storage drive 714 reads from and/or writes to a removable storage unit 718 in a well-known manner. Removable storage unit 718 represents a floppy disk, a magnetic tape, an optical disk, etc., which is read by and written to removable storage drive 714. As will be appreciated, the removable storage unit 718 includes a computer usable storage medium having stored therein computer software and/or data.

In alternative variations, secondary memory 710 may include other similar devices for allowing computer programs or other instructions to be loaded into computer system 700. Such devices may include, for example, a removable storage unit 722 and an interface 720. Examples of such may include a program cartridge and a cartridge interface (such as that found in video game devices), a removable memory chip (such as an erasable programmable read-only memory (EPROM) or a programmable read-only memory (PROM)) and associated socket, and other removable storage units 722 and interfaces 720, which allow software and data to be transferred from the removable storage unit 722 to computer system 700.

Computer system 700 may also include a communications interface 724. Communications interface 724 allows software and data to be transferred between computer system 700 and external devices. Examples of communications interface 724 may include a modem, a network interface (such as an Ethernet card), a communications port, a Personal Computer Memory Card International Association (PCMCIA) slot and card, etc. Software and data transferred via communications interface 724 are in the form of signals, which may be electronic, electromagnetic, optical, or other signals capable of being received by communications interface 724. These signals are provided to communications interface 724 via a communications path (e.g., channel) 726. This path 726 carries signals and may be implemented using wire or cable, fiber optics, a telephone line, a cellular link, a radio frequency (RF) link, and/or other communications channels. In this document, the terms "computer program medium," "computer-usable medium," and "computer-readable medium" are used to refer generally to media such as a removable storage drive 714, a hard disk installed in hard disk drive 712, and signals. These computer program products provide software to the computer system 700. Aspects of the invention are directed to such computer program products.

Computer programs (also referred to as computer control logics) are stored in main memory 708 and/or secondary memory 710. Computer programs may also be received via communications interface 724. Such computer programs, when executed, enable the computer system 700 to perform the features in accordance with aspects of the present invention, as discussed herein. In particular, the computer programs, when executed, enable the processor 704 to perform such features. Accordingly, such computer programs represent controllers of the computer system 700.

In a variation where aspects of the invention are implemented using software, the software may be stored in a computer program product and loaded into computer system 700 using removable storage drive 714, hard disk drive 712, or communications interface 720. The control logic (software), when executed by the processor 704, causes the processor 704 to perform the functions as described herein. In another variation, aspects of the invention are implemented primarily in hardware using, for example, hardware components, such as application-specific integrated circuits (ASIC's). Implementation of the hardware state machine so as to perform the functions described herein will be apparent to persons skilled in the relevant art(s).

In yet another variation, aspects of the invention are implemented using a combination of both hardware and software.

While aspects of the present invention have been described in connection with preferred implementations, it will be understood by those skilled in the art that variations and modifications (e.g. similar functionalities, purposes, adaptations, configurations) described above may be made without departing from the scope hereof. Other aspects will be apparent to those skilled in the art from a consideration of the specification or from a practice of the aspects of the invention disclosed herein.

What is claimed is:

1. A method, comprising:
   detecting a collision;
   initiating discovery of collision-activated information exchange devices (CIED's) related to the collision;
   if at least one of the CIED's is discovered:
   establishing a wireless connection with the at least one CIED; and
   exchanging collision-related information with the at least one CIED;
   if no CIED's are discovered, initiating discovery of remote devices that are not collision-activated;
   if at least one of the remote devices is discovered:
   establishing a wireless connection with the at least one remote device; and
   exchanging collision-related information with the at least one remote device.

2. The method of claim 1, wherein exchanging collision-related information with the at least one CIED comprises:
   transmitting a first set of collision-related information to the at least one CIED; and
   receiving a second set of collision-related information from the at least one CIED.

3. The method of claim 2, wherein the first set of collision-related information comprises identification information and recorded collision parameters of a first vehicle, and wherein the second set of collision-related information comprises identification information and recorded collision parameters of a second vehicle.

4. The method of claim 3, wherein the identification information comprises at least one of a Vehicle Identification Number (VIN), a Hull Identification Number (HIN), and wherein the collision parameters comprise at least one of a date and a time of the collision, velocity and acceleration profiles of the vehicle prior to and during impact, and geographic coordinates of the vehicle.

5. A communication device, comprising:
   a sensor configured to detect a collision;
   a wireless communication radio;
   a processor coupled to the sensor and the wireless communication radio, the processor configured to:
   initiate discovery of collision-activated information exchange devices (CIED's) related to the collision;
   if at least one of the CIED's is discovered:
   establish a wireless connection with the at least one CIED via the wireless communication radio; and
   exchange collision-related information with the at least one CIED via the wireless communication radio;
   if no CIED's are discovered, initiate discovery of remote devices that are not collision-activated;
   if at least one of the remote devices is discovered:
   establish a wireless connection with the at least one remote device via the wireless communication radio; and
   exchange collision-related information with the at least one remote device via the wireless communication radio.

6. An apparatus, comprising:
   means for detecting a collision;
   means for initiating discovery of collision-activated information exchange devices (CIED's) related to the collision;
   if at least one of the CIED's is discovered, the means for initiating is further for:
   establishing a wireless connection with the at least one LIED; and
   exchanging collision-related information with the at least one LIED;
   if no CIED's are discovered, the means for initiating is further for initiating discovery of remote devices that are not collision-activated;

if at least one of the remote devices is discovered, the means for initiating is further for:
   establishing a wireless connection with the at least one remote device; and
   exchanging collision-related information with the at least one remote device.

7. A non-transitory computer-readable medium comprising code for:
   detecting a collision;
   initiating discovery of collision-activated information exchange devices (CIED's) related to the collision;
   if at least one of the CIED's is discovered:
      establishing a wireless connection with the at least one LIED; and
      exchanging collision-related information with the at least one LIED;
   if no CIED's are discovered, initiating discovery of remote devices that are not collision-activated;
   if at least one of the remote devices is discovered:
      establishing a wireless connection with the at least one remote device based on the response; and
      exchanging collision-related information with the at least one remote device.

8. The method of claim 1, further comprising:
   after detecting the collision and prior to initiating the discovery of the CIED's, activating a standby mode for a period of time to detect any subsequent collisions.

9. The method of claim 3, wherein the collision parameters include at least one of a velocity profile and an acceleration profile of the vehicle at least prior to or during impact.

10. The method of claim 1, wherein the remote device is a mobile phone, and wherein exchanging the collision-related information with the remote device includes receiving at least a mobile phone number of the mobile phone.

* * * * *